United States Patent
Snyder, II et al.

(10) Patent No.: US 10,644,998 B2
(45) Date of Patent: May 5, 2020

(54) VIRTUALIZED NETWORK INTERFACE FOR LOCKDOWN AND OVERLAY OF DATA IN TRANSMITTED PACKETS

(71) Applicant: Cavium, LLC, Santa Clara, CA (US)

(72) Inventors: Wilson Parkhurst Snyder, II, Holliston, MA (US); Philip Romanov, Santa Clara, CA (US); Shahe Hagop Krakirian, Palo Alto, CA (US)

(73) Assignee: Cavium, LLC, Santa Clara, CA (US)

( * ) Notice: Subject to any disclaimer, the term of this patent is extended or adjusted under 35 U.S.C. 154(b) by 201 days.

(21) Appl. No.: 14/106,827

(22) Filed: Dec. 15, 2013

(65) Prior Publication Data
US 2015/0172180 A1   Jun. 18, 2015

(51) Int. Cl.
| | | |
|---|---|---|
| G06F 3/00 | (2006.01) | |
| H04L 12/713 | (2013.01) | |
| G06F 9/455 | (2018.01) | |
| G06F 13/24 | (2006.01) | |
| G06F 9/48 | (2006.01) | |
| G06F 12/02 | (2006.01) | |

(52) U.S. Cl.
CPC ........ *H04L 45/586* (2013.01); *G06F 9/45558* (2013.01); *G06F 9/4812* (2013.01); *G06F 12/02* (2013.01); *G06F 13/24* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,094,307 B1* | 7/2015 | Edsall | H04L 43/0852 |
| 2003/0174703 A1* | 9/2003 | Relan | H04L 45/742 370/392 |
| 2004/0003141 A1* | 1/2004 | Matters | H04L 69/324 710/1 |
| 2006/0181909 A1* | 8/2006 | Hinojosa | G06F 12/1027 365/49.1 |

(Continued)

OTHER PUBLICATIONS

Vijn, Jasper, "Working with bits and bitfields" (online), Published May 28, 2008, retrieved from Internet : <URL: http://www.coranac.com/documents/working-with-bits-and-bitfields/> (Year: 2008).*

*Primary Examiner* — Henry Tsai
*Assistant Examiner* — Aurangzeb Hassan
(74) *Attorney, Agent, or Firm* — pkalousek.ip

(57) ABSTRACT

A method and a system embodying the method for data lockdown and data overlay in a packet to be transmitted, comprising providing a first and a second masks comprising one or more position(s) and a data value at each of the one or more position(s); aligning the masks with the packet; comparing the data value at each of the one or more position(s) in the first mask with the data value at the one or more aligned position(s) in the packet; optionally replacing a data value at each of the one or more position(s) in the packet with a data value at the one or more aligned position(s) in the second mask; and providing the packet for transmission if the data value at each of the one or more position(s) in the first mask and the data value at the one or more aligned position(s) in the packet agree.

28 Claims, 3 Drawing Sheets

(56) References Cited

U.S. PATENT DOCUMENTS

| | | | |
|---|---|---|---|
| 2007/0110053 A1* | 5/2007 | Soni | H04L 63/0263 370/389 |
| 2008/0235690 A1* | 9/2008 | Ang | G06F 9/526 718/102 |
| 2008/0247380 A1* | 10/2008 | LaVigne | H04L 63/101 370/351 |
| 2010/0272120 A1* | 10/2010 | Liang | H04N 21/434 370/465 |
| 2011/0194557 A1* | 8/2011 | Baban | H04L 45/16 370/390 |
| 2011/0243136 A1* | 10/2011 | Raman | H04L 45/60 370/392 |
| 2013/0205376 A1* | 8/2013 | Narasimha | H04L 9/3247 726/6 |
| 2013/0242989 A1* | 9/2013 | Bhagavathiperumal | H04L 12/4641 370/390 |
| 2014/0064280 A1* | 3/2014 | Qin | H04B 7/18582 370/392 |
| 2014/0136812 A1* | 5/2014 | Stark | G06F 13/00 711/211 |
| 2014/0310704 A1* | 10/2014 | Cantu | G06F 9/45558 718/1 |
| 2015/0019563 A1* | 1/2015 | Wildman | G06F 17/3033 707/747 |

* cited by examiner

VIRTUALIZED NETWORK INTERFACE FOR LOCKDOWN AND OVERLAY OF DATA IN TRANSMITTED PACKETS

BACKGROUND

1. Field

The present disclosure relates to communications in computer networks. More particularly, this invention is directed toward a virtualized network interface for lockdown and overlay of data in transmitted packets.

2. Description of Related Technology

In computer systems, virtualization is a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

In a typical host machine, the virtual hardware operating platform should be presented to the virtual machines in a manner that assures that the virtual nature of the hardware platform should not be discernible to the virtual machines. Consequently, the host machine should avoid conflicts between virtual machines in accessing the computing resources. To accomplish these goals, the host machine may implement a translation scheme between the virtual machines' software and the host machine's resources. With regard to accessing network resources, for example, the host machine may support virtual network interface that are presented to respective virtual machines. The virtual network interface Virtual Network Interface Card (VNIC) appears to the virtual machine as a physical Network Interface Card (NIC). However, the host machine translates between the VNIC and the NIC. As a result, the host machine can manage the network resources for multiple virtual machines.

Upon assembling a packet for a transmission from a local machine over a network to a remote machine, it is desirable to examine the packet data to determine whether portions of or the entire data in the packet have a potential to corrupts packets of another VNIC, e.g., by being redirected to that another VNIC, as well as for the possibility that the VNIC transmitting the packet does pretend ("masquerade" itself) to be another VNIC. Although the masquerading does not necessarily directly harm other traffic through corruption, the masquerading may cause indirect harm, e.g., by allowing exposure of the network topology.

As known to person of ordinary skills in the art, existing implementations attempt to mitigate corruption and masquerading, by requiring that VNIC(s) enforce(s) that an Ethernet source address must be present in the header data of all transmitted packets ("Media Access Control (MAC) lockdown"). Later this mitigation was extended to further enforce that a field in the header data identifying a specific VLAN must be present, this "VLAN lockdown" being enforced by a NIC. However, such an implementation omits the possibility that certain entities of an architectural implementation may make still other data in the packet prone to corruption and/or masquerading. By means of an example, such an entity may comprise an on-chip switch, which would mandate lockdown of the switch related data in the packet. Such an on-chip switch may be interposed between a NIC and an Ethernet MAC and enforce a packets belonging to a stream to be delivered only to a particular port. Clearly the data defining the port must be locked to prevent another entity, i.e., an application generating the packet stream, to change the port. The data defining the port may be stripped by the on-chip switch after the data were used. Further details regarding the on-chip switch are disclosed in co-pending application Ser. No. 14/037,245, entitled "Semiconductor with Virtualized Computation and Switch Resources" filed on Sep. 25, 2013, incorporated therein by reference.

As the example of the on-switch chip illustrates, the other data in the packet prone to corruption and/or masquerading do not necessarily need to be defined by the Ethernet, Internet Protocol (IP), or other protocol known to person of ordinary skills in the art because the other data may be for consumption of the entity and may be stripped out after being used.

Accordingly, there is a need in the art for a management of virtual network interface(s) providing solution to the above identified problems, as well as additional advantages evident to a person of ordinary skills in the art.

SUMMARY

In one aspect of the disclosure, an apparatus and a method for data lockdown as well as an apparatus and a method for data overlay according to appended independent claims are disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein:

The description of like structural elements among FIG. 1 and FIG. 2, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. Any unreferenced double-arrow line indicates a possible information flow between the depicted entities.

DETAILED DESCRIPTION

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 1A:
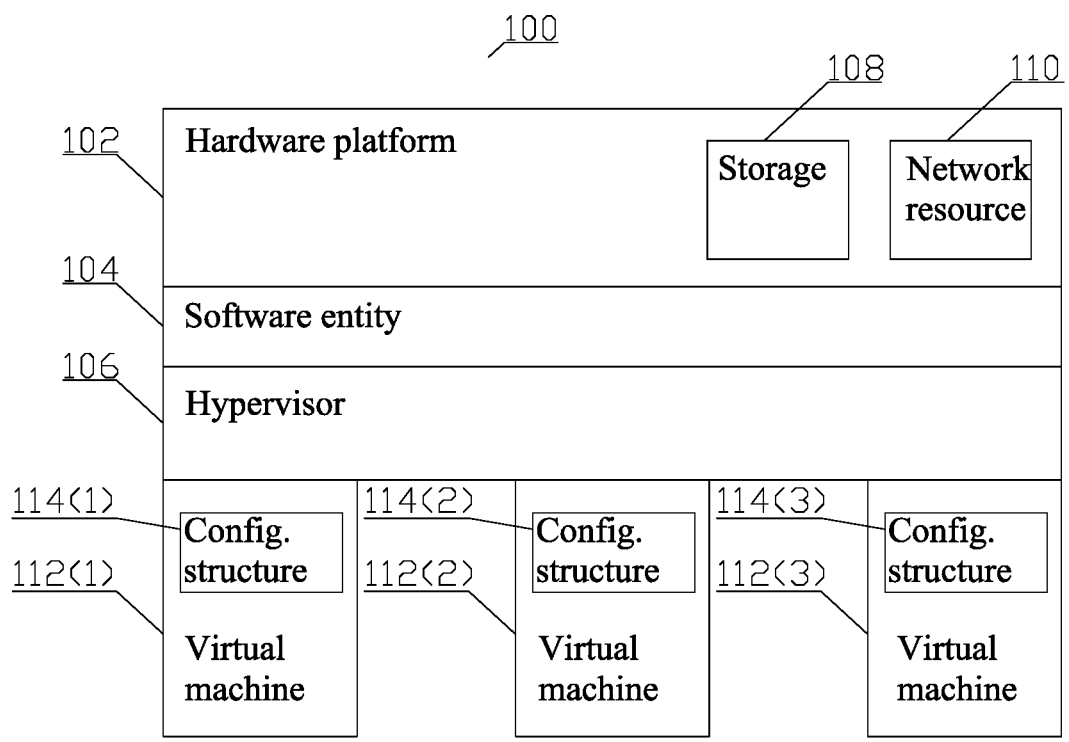
FIG. 1a depicts a conceptual structure of a virtualization system in accordance with an aspect of this disclosure.

FIG. 1a depicts a conceptual structure of a virtualization system 100 in accordance with an aspect of this disclosure. A hardware platform 102 together with an optional software entity 104, i.e., operating system, comprises a host machine operating a Type 2, also known as hosted, hypervisor 106. As well known to a person of ordinary skills in the art, the optional software entity 104 is not necessary for Type 1 hypervisors, also known as native hypervisors. The aspects of the disclosure are equally applicable to both types of hypervisors.

The hardware platform 102, comprises all physical entities embodying computing resources required by a specific host machine, i.e., a central processor unit, an input/output resources, a storage system, a network resource, and other resources known to a person skilled in the art. To avoid undue complexity, only a storage system 108, and a network resource 110 are shown. The storage system 108, may comprise a hard drive, a semiconductor based memory, and other types of memory known in the art. The network resource 110 comprises at least one NIC.

The hypervisor 106 creates and operates at least one virtual machine 112. Although three virtual machines 112 are shown, a person skilled in the art would understand that any number, including a single virtual machine, may exist. Parameters configuring operation of the virtual machine 112 are defined via structure 114. In one aspect, the structure 114 may comprise at least one register.

Figure 1B:
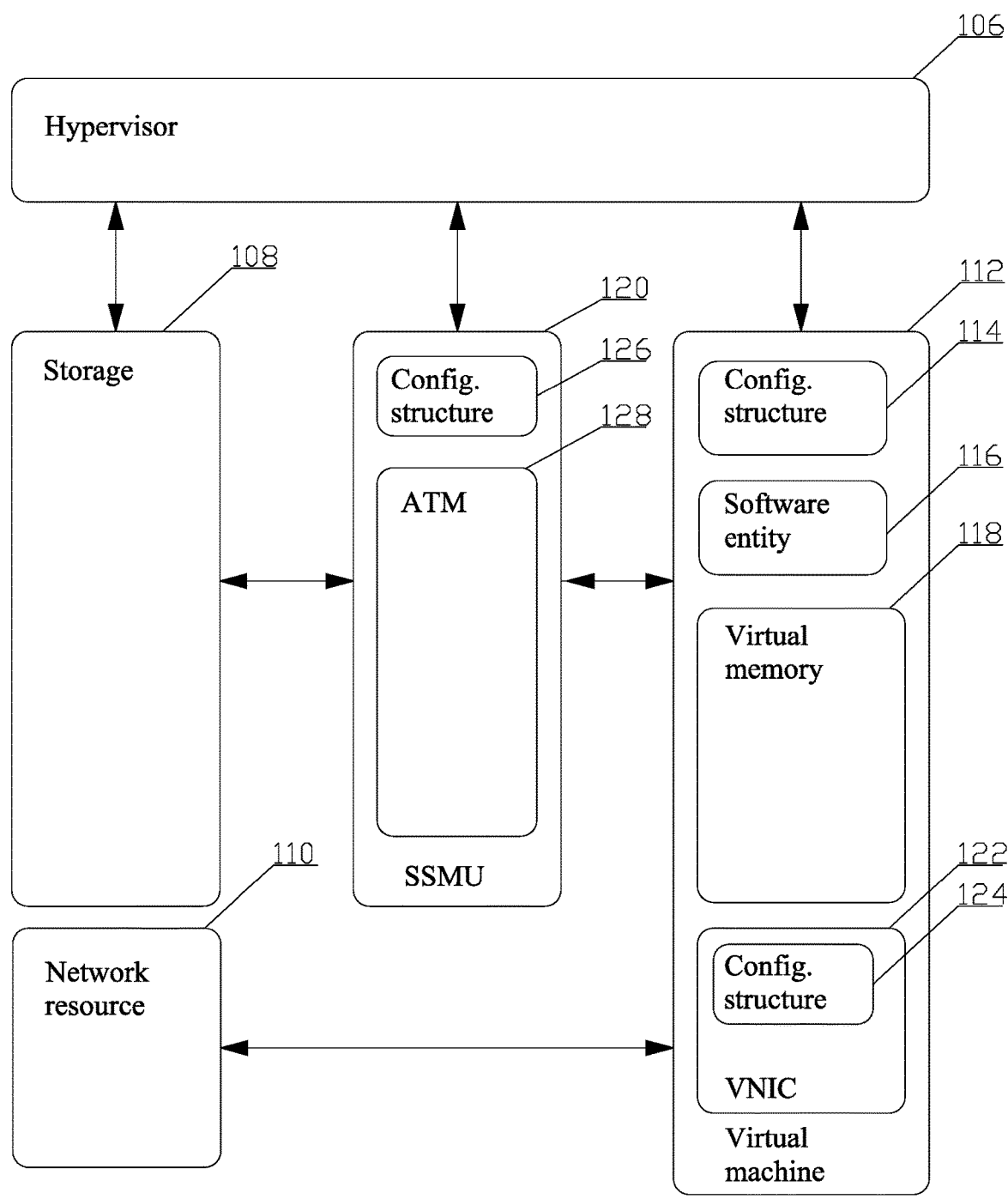
FIG. 1b depicts a more detailed view of the conceptual structure of the virtualization system in accordance with an aspect of this disclosure.

Referring to FIG. 1b, depicting a more detailed view of the conceptual structure of the virtualization system in accordance with an aspect of this disclosure, each of the virtual machines 112 operates a software entity 116. The software entity 116 may comprise at least one application, alternatively, the software entity 116 may comprise an operating system that operates the at least one an application. Each of the virtual machines 112 may operates a different instance of the same software entity 116; alternatively, at least one virtual machine 112 may operates different software entities 116.

A hypervisor 106, each virtual machine 112 and optionally each software entity 116 is further provided with a virtual memory 118. The virtual memory 118 may further be divided into a plurality of regions (not shown) allocated to different entities, i.e., the hypervisor 106, the VNIC(s), the application(s), and other entities known to persons of ordinary skills in the art. The virtual memory 118 accesses the storage system 108 on the host machine via a System Memory Management Unit (SMMU) 120.

Each virtual machine 112 is provided with a virtual network interface card (VNIC) 122 to enable communication with another virtual machine 112 via an on-chip switch (not shown). The on-chip switch may be implemented in the hypervisor 106 or in the NIC 110, as well known to a person skilled in the art. The disclosure is agnostic to a specific implementation. Additionally, the VNIC 122 further enables each virtual machine 112 to communicate with a different remote machine via the on-chip switch and/or the NIC 110.

To carry out data lockdown, the hypervisor 106 initiates structures that configure an operation of 110 (structure not shown), each of VNICs 122, i.e., structure 124, as well as structure 126 configuring an operation of the SMMU 120. Structure 126 set permissions specifying for each VNIC 122 regions of virtual memory 118 that the VNIC 122 may access for reading or writing. Structures 126 further set an Address Translation Map (ATM) 128 to translate addresses between the virtual memory 118 and the storages system 108.

Figure 2:
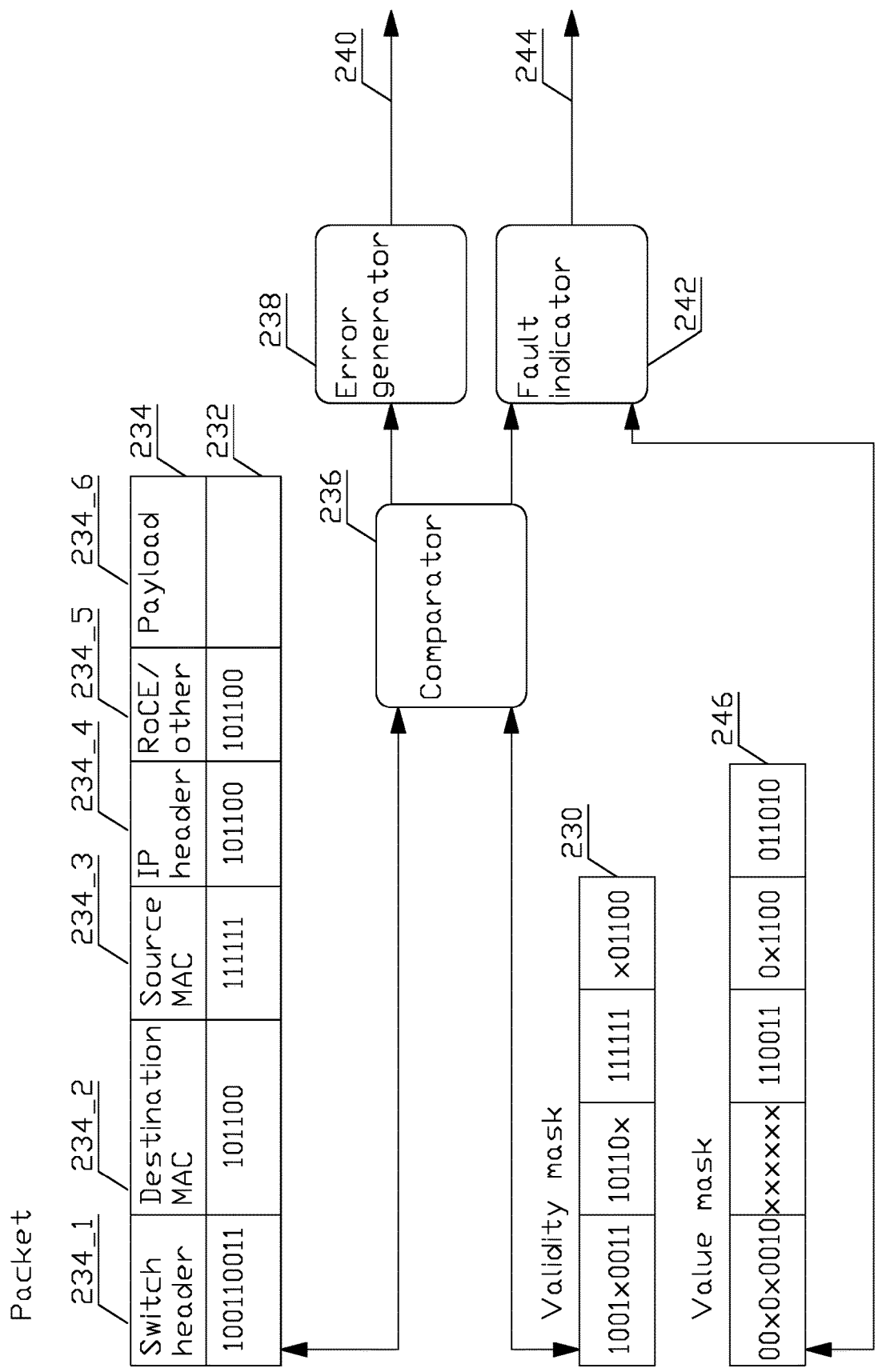
FIG. 2 depicts a conceptual structure and information flow enabling the process of data lockdown and data overlay in a packet intended for transmission.

Referring now to FIG. 2 in conjunction with FIGS. 1a-1b, to clarify the relationship between certain elements of FIG. 2 and FIGS. 1a-1b, the references to elements of FIGS. 1a-1b are in parenthesis. As part of the configuration of the NIC (110) related structures, the hypervisor (106) initiates for each VNIC (122) structures (124) that specify at least one validity mask 230 specifying a data value at each of one or more positions corresponding to one or more lockable positions at a packet 232 to be transmitted. A position is a place holding a value. A lockable position refers to a position of the packet 232 that may be locked. The validity mask 230 is formatted in accordance with design criteria, i.e., memory requirement, computational expense, and other criteria known to person of ordinary skills in the art.

In one aspect, the validity mask 230 may comprise positions and data values at the positions corresponding only to the packet's lockable positions, the data of which are to be locked. This aspect may decrease memory requirement, e.g., if data at only few packet's lockable positions need to be locked, but alignment may be more computational expensive. An alignment assures that data values at the positions in the validity mask 230 are compared with the data at the packet's lockable positions the data of which are to be locked.

In another aspect, the validity mask 230 may comprise the same number of positions as the number of the packet's lockable positions. At the validity mask 230 positions corresponding to the packet's lockable positions the data of which are to be locked, the data value is set to the required value; at the validity mask positions corresponding to the packet's lockable positions the data of which are not to be locked the data value is set to a "do-not care" value. As known to a person of ordinary skills in the art, a do-not care value comprises an input value to a function that does not result in any changes to the output. By means of an example, for a binary logic the validity mask 230 specifies that the required value of a particular bit must be a first value (1), must be a second value (0), and the do not care value for a particular bit is (x). This aspect may require more memory, e.g., if potentially lockable data comprise large number of positions, but alignment may be computationally less expensive, requiring only alignment of the packet's first lockable position with a mask's first position. Although a binary logic, as a representative of a logic most frequently encountered, is used for clarity of explanation in the following description, the concept are equally applicable to a multi-valued logic.

The number of packets lockable positions depends on an implementation that balances implementation cost, i.e., an area, power, and other implementation costs known to a person skilled in the art versus the total number of positions created by a particular protocol used for formatting the packet. By means of an example, data at all packet positions may be locked; alternatively only data at a subset of packet positions may be locked. Such a subset may comprise a header of a packet or only selected fields of the header.

FIG. 2 further depicts the packet structure 234 in terms of fields comprising N lockable bits, e.g., optional switch header 234_1, destination MAC 234_2, source MAC 234_3, Internet Protocol (IP) header 234_4. The remaining fields, e.g., RoCE or other header 234_5, and other fields including payload are summarily depicted as a reference 234_6. A person of ordinary skills in the art will understand that these fields are used for illustration only, and different fields, including all the fields in the packet 232, may be lockable.

Although only one validity mask 230 is shown in FIG. 2, there may be a plurality of validity masks, each of the plurality of validity masks may specify different values for different number N of bits in accordance to a protocol used, i.e., TCP, RoCE, and other protocols known to person of ordinary skills in the art; in accordance to which VNIC the validity mask is to be applied, and other parameters known to person of ordinary skills in the art.

Once the packet 232 is assembled in accordance to the protocol used for transmission, e.g., TCP, RoCE, and other protocols known to person of ordinary skills in the art, the VNIC (122) examines the packet 232 for potential to corrupts packets of another VNIC, as well as for "masquerading". To carry out the examination, the VNIC (122) select the appropriate validity mask 230, aligns the validity mask 230 with respect to the lockable bits of the packet 232, and compares values of bits of the validity mask 230 with corresponding bits of the packet data 232 by a comparison means 236. Such comparison means 236 may carry out the comparison by taking a value of a bit from the packet 232 and corresponding value of a bit from the validity mask 230 and providing the values to a first respective a second input of a comparator.

If the comparison means 236 indicates that the validity mask 230 and the packed data 232 disagree, the comparator's output is provided to an error generator 238 that generates a fault indication 240. The fault indication 240 may be reported to the VNIC (122) that may elect from several actions, i.e., drop (not transmit) the packet, increment a hypervisor drop statistic, increment a guest drop statistic, cause a hypervisor interrupt, cause an interrupt at the software entity (116) for which the packet is intended, create an event indicating the error, or any permutation of the above. Additionally, if the NIC (110) is equipped with the ability to log information about the address that caused the fault recorded by the VNIC (122) when the fault indication 240 was detected, in some cases it is possible for the hypervisor (106) to correct the error (such as bringing a page into memory) then asking the virtual machine (112) to retry the operation from the point where the fault occurred.

Alternatively, if the comparison means 236 indicates that the validity mask 230 and the packed data 232 agree, the packed data 232 is considered harmless and the packet 232 is provided either directly (not shown), or through an optional combiner 242 for transmission 244.

A person of ordinary skills in the art will understand that in case a do not care value is received by the comparison means 236, the compared values are considered to agree.

The optional combiner 242 enables the VNIC (122) to further overlay a value of a bit at one or more location in the packet data 232, by inserting a value specified by the hypervisor (106), e.g., a congestion management tag, date/time, or computed by the VNIC (122), e.g., a queue number on which a packet arrived, the length of the packet, or other parameters. Such an overlay allows the VNIC (122) to insert information that is opaque to the application generating the packet.

To accomplish such a functionality, as part of the configuration of the NIC (110) related structure, the hypervisor (106) configures for each VNIC (122) structures (124) that specify at least one value mask 246 specifying a data value at each of one or more positions corresponding to one or more positions at a packet 232 to be transmitted. As depicted, the packet's lockable positions are different from the positions to be overlaid. However, in a different aspect, the packet's lockable positions and the positions to be overlaid may be the same.

The value mask is formatted in accordance with design criteria, i.e., memory requirement, computational expense, and other criteria known to person of ordinary skills in the art. The design criteria are substantially equivalent to the criteria for the validity mask supra.

Although only one value mask 246 is shown in FIG. 2, there may be a plurality of value masks, each of the plurality of value masks may specify different values for different number N of bits in accordance to protocol used, i.e., TCP, RoCE, and other protocols known to person of ordinary skills in the art; in accordance to which VNIC 122 is being used as provisioned by the hypervisor (106) to which the value mask is to be applied, and other parameters known to person of ordinary skills in the art.

The VNIC 122 selects the appropriate value mask 246 and aligns the value mask 246 with respect to the N bits of the packet 232 a data of which is to be overlaid. The process of value overlay is carried out by the combiner 242 that for each of the N bits accepts an output data value from the comparator means 236 and a corresponding data value from the value mask 246 and replaces the data value of the output data value from the comparator means 236 with the data value of the value mask 246. In one aspect, the combiner 242 may comprise a logical OR, XOR, and other functions known to person of ordinary skills in the art. The output of the combiner 242 is provided for transmission 244 as disclosed supra.

A person skilled in the art will appreciate that the aspects of the application are agnostic to a particular implementation of the comparison means 236. Thus such comparison may compare one pair of bits at a time, and after accomplishing the comparison, move to the next pair of bits, until all N bits are compared, i.e., perform serial comparison. In another aspect, the comparison may compare at least two pairs of bits at a time, i.e., parallel comparison. In yet another aspect the comparison may comprise a combination of serial and parallel comparison.

The various aspects of this disclosure are provided to enable a person of ordinary skill in the art to practice the present invention. Various modifications to these aspects will be readily apparent to persons of ordinary skills in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example only although FIG. 2 depicts that the data value at the first position of the packet to be transmitted is lockable, this does not need to be the case, thus the lockable data may start at any position. Similarly, the fact that the validity mask 230, contains symbols (1), (0), and (x); this is not to be interpreted as a disclosing merely a validity mask according to a disclosed aspect. In fact, the symbols (1), (0) may be interpreted as required values at the packet's lockable positions the data of which are to be locked, and the symbol (x) may be interpreted as not requiring a position in the validity mask according to another disclosed aspect.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for data lockdown, comprising:
   providing a first mask comprising one or more position(s) and a data value at each of the one or more position(s);
   aligning the first mask with a packet to be transmitted;
   comparing the data value at each of the one or more position(s) in the first mask with a data value at each of one or more aligned position(s) in the packet to be transmitted;
   providing the packet for transmission if the comparing indicates that the data value at each of the one or more position(s) in the first mask and the data value at each of one or more aligned lockable position(s) in the packet to be transmitted agree; and
   dropping the packet if the comparing indicates that the data value at each of the one or more position(s) in the first mask and the data value at each of the one or more aligned lockable position(s) in the packet to be transmitted disagree.

2. The method as claimed in claim 1, further comprising:
   providing a second mask comprising one or more position(s) and a value at each of the one or more position(s);
   aligning the second mask with the packet to be transmitted; and
   replacing a data value at each of one or more position(s) in the packet to be transmitted with a data value at one or more aligned position(s) in the second mask.

3. The method as claimed in claim 1, wherein the providing a first mask comprises:
   selecting the first mask from a plurality of first masks, each of the plurality of first masks specifying different data value at at least one of the one or more position(s); and
   providing the selected first mask.

4. The method as claimed in claim 1, wherein the providing a first mask comprises:
   providing a first mask comprising one or more position(s) and a data value at each of the one or more position(s) corresponding to the one or more lockable position(s) in the packet to be transmitted, the data value of which are to be locked.

5. The method as claimed in claim 4, wherein the aligning the first mask with the packet comprises:
   aligning the data values at the one or more position(s) in the first mask with the data values at the one or more lockable position(s) in the packet to be transmitted, the data values of which are to be locked.

6. The method as claimed in claim 4, wherein the providing the packet for transmission comprises:
   providing the packet for transmission if the comparison indicates that the data value at each of the one or more position(s) in the first mask and the data value at each of the one or more lockable position(s) in the packet to be transmitted, the data of which are to be locked agree.

7. The method as claimed in claim 1, wherein the providing a first mask comprises:
   providing a first mask comprising one or more position(s) and a data vale at each of the one or more position(s);
   setting the values at the one or more position(s) corresponding to the one or more lockable position(s) in the packet to be transmitted to be locked to a required value; and
   setting the values at the one or more position(s) not set to the required value to a do not care value.

8. The method as claimed in claim 7, wherein the aligning the first mask with the packet comprises:
   aligning first position in the packet to be transmitted with the first mask's first position.

9. The method as claimed in claim 7, wherein the providing the packet for transmission comprises:
   providing the packet for transmission if the comparison indicates that the required data values at each of the one or more position of the first mask and the data values at the one or more lockable position(s) in the packet to be transmitted, the data of which are to be locked agree.

10. A method for data overlay, comprising:
   selecting a mask from a plurality of masks, each of the plurality of the masks comprising one or more position(s) and a data value at each of the one or more position(s) and specifying different data value at at least one of the one or more position(s);
   providing the selected mask;
   aligning the provided mask with a packet to be transmitted; and
   replacing a data value at each of one or more position(s) in the packet to be transmitted with a data value at one or more aligned position(s) in the provided mask.

11. The method as claimed in claim 10, wherein the providing the selected mask comprises:
   providing the selected mask comprising one or more position(s) and a data value at each of the one or more position(s) corresponding to the one or more position(s) in the packet to be transmitted, the data value of which are to be overlaid.

12. The method as claimed in claim 11, wherein the aligning the provided mask with the packet to be transmitted comprises:
   aligning the data values at the one or more positions in the provided mask with the data values at the one or more position(s) in the packet to be transmitted, the data values of which are to be overlaid.

13. The method as claimed in claim 10, wherein the providing the selected mask comprises:
   providing the selected mask comprising one or more position(s) corresponding to each of the one or more position(s) in the packet to be transmitted;
   setting the values at the one or more position(s) corresponding to the one or more packet's position(s) to be overlaid to a required value; and
   setting the values at the one or more position(s) not set to the required value to a do not care value.

14. The method as claimed in claim 13, wherein the aligning the provided mask with the packet to be transmitted comprises:
   aligning first position of the packet to be transmitted with the provided mask's first position.

15. An apparatus for data lockdown, comprising:
   a hypervisor configured to provide a first mask comprising one or more position(s) and a data value at each of the one or more position(s); and
   a virtual network interface card communicatively coupled to the hypervisor, the virtual network interface card configured to:
      align the first mask with a packet to be transmitted,
      compare the data value at each of the one or more position(s) in the first mask with a data value at each of one or more aligned position(s) in the packet to be transmitted, and
      provide the packet for transmission if the comparing indicates that the data value at each of the one or more position(s) in the first mask and the data value at each of one or more aligned lockable position(s) in the packet to be transmitted agree; and
      drop the packet if the comparison indicates that the data value at each of the one or more position(s) in the first mask and the data value at each of the one or more aligned lockable position(s) in the packet to be transmitted disagree.

16. The apparatus as claimed in claim 15, wherein the hypervisor is configured to provide a second mask comprising one or more position(s) and a value at each of the one or more position(s); and
   the virtual network interface card is configured to:
      align the second mask with the packet to be transmitted; and
      replace a data value at each of one or more position(s) in the packet to be transmitted with a data value at one or more aligned position(s) in the second mask.

17. The apparatus as claimed in claim 15, wherein the hypervisor is configured to
   select the first mask from a plurality of first masks, each of the plurality of first masks specifying different data value at at least one of the one or more position(s); and
   provide the selected first mask.

18. The apparatus as claimed in claim 15, wherein the hypervisor is configured to
   provide a first mask comprising one or more position(s) and a data value at each of the one or more position(s) corresponding to the one or more lockable position(s) in the packet to be transmitted, the data value of which are to be locked.

19. The apparatus as claimed in claim 18, wherein virtual network interface card is configured to
   align the data values at the one or more position(s) in the first mask with the data values at the one or more lockable position(s) in the packet to be transmitted, the data values of which are to be locked.

20. The apparatus as claimed in claim 18, wherein the virtual network interface card is configured to
   provide the packet for transmission if the comparison indicates that the data value at each of the one or more position(s) of the first mask and the data value at each of the one or more lockable position(s) in the packet to be transmitted, the data of which are to be locked agree.

21. The apparatus as claimed in claim 15, wherein the hypervisor is configured to:
   provide a first mask comprising one or more position(s) and a data vale at each of the one or more lockable positions in the packet to be transmitted;
   set the values at the one or more position(s) corresponding to the one or more lockable position(s) in the packet to be transmitted to be locked to a required value; and
   set the values at the one or more position(s) not set to the required value to a do not care value.

22. The apparatus as claimed in claim 21, wherein virtual network interface card is configured to
   align first position in the packet with the first mask's first position.

23. The apparatus as claimed in claim 21, wherein virtual network interface card is configured to
   provide the packet for transmission if the comparison indicates that the required data values at each of the one or more position of the first mask and the data values at the one or more lockable position(s) in the packet to be transmitted, the data of which are to be locked agree.

24. An apparatus for data overlay, comprising: a hypervisor configured to: select a mask from a plurality of masks, each of the plurality of the masks comprising one or more position(s) and a data value at each of the one or more position(s) and specifying different data value at least one of the one or more position(s); and provide the selected mask; and a virtual network interface card communicatively coupled with the hypervisor, the virtual network interface card configured to: align the provided mask with a packet to be transmitted; and replace a data value at each of one or more position(s) in the packet to be transmitted with a data value at one or more aligned position(s) in the provided mask.

25. The apparatus as claimed in claim 24, wherein the hypervisor is configured to:
   provide the selected mask comprising one or more position(s) and a data value at each of the one or more position(s) corresponding to the one or more position(s) in the packet to be transmitted, the data value of which are to be overlaid.

26. The apparatus as claimed in claim 25, wherein virtual network interface card is configured to:
   align the data values at the one or more positions in the provided mask with the data values at the one or more position(s) in the packet to be transmitted, the data values of which are to be overlaid.

27. The apparatus as claimed in claim 24, wherein the hypervisor is configured to
   provide the selected mask comprising one or more position(s) corresponding to each of the one or more position(s) in the packet to be transmitted;
   set the values at the one or more position(s) corresponding to the one or more position(s) in the packet to be transmitted to be locked to a required value; and
   set the values at the one or more position(s) not set to the required value to a do not care value.

28. The apparatus as claimed in claim 27, wherein the virtual network interface card is configured to:
   align first position of the packet to be transmitted with the provided mask's first position.

\* \* \* \* \*

UNITED STATES PATENT AND TRADEMARK OFFICE
CERTIFICATE OF CORRECTION

PATENT NO. : 10,644,998 B2
APPLICATION NO. : 14/106827
DATED : May 5, 2020
INVENTOR(S) : Wilson Parkhurst Snyder, II, Philip Romanov and Shahe Hagop Krakirian It is certified that error appears in the above-identified patent and that said Letters Patent is hereby corrected as shown below:

In the Claims

Column 10, Line 62, insert the text --at-- after the text "position(s) and specifying different data value" and before the text "at least one of".

Signed and Sealed this
Fourth Day of August, 2020

Andrei Iancu
*Director of the United States Patent and Trademark Office*